United States Patent [19]

Deichert et al.

[11] Patent Number: 4,943,150
[45] Date of Patent: Jul. 24, 1990

[54] METHOD OF MAKING VARIABLE MODULUS LENSES

[75] Inventors: William G. Deichert, Macedon; Richard J. Wrue, Rochester, both of N.Y.

[73] Assignee: Bausch & Lomb Incorporated, Rochester, N.Y.

[21] Appl. No.: 171,585

[22] Filed: Mar. 22, 1988

[51] Int. Cl.⁵ .................... G02C 7/04; B29D 11/00
[52] U.S. Cl. ..................... 351/177; 264/2.6; 351/160 H
[58] Field of Search ............ 351/160 R, 160 H, 161, 351/162, 177; 264/2.6

[56] References Cited

U.S. PATENT DOCUMENTS

| | | | |
|---|---|---|---|
| 3,488,111 | 1/1970 | Isen | 351/160 R |
| 3,489,491 | 1/1970 | Creighton | 351/160 R |
| 3,619,044 | 11/1971 | Kamath | 351/160 R |
| 3,915,609 | 10/1975 | Robinson | 351/177 X |
| 3,944,347 | 3/1976 | Barkdoll | 351/160 R |
| 3,973,838 | 8/1976 | Page | 351/160 R |
| 4,093,361 | 6/1978 | Erickson | 351/160 R |
| 4,166,255 | 8/1979 | Graham | 351/160 R |
| 4,208,362 | 6/1980 | Deichert | 264/1 |
| 4,666,249 | 5/1987 | Bauman | 351/160 H |
| 4,701,288 | 10/1987 | Cook | 264/1.4 |
| 4,702,574 | 10/1987 | Bawa | 351/177 X |

Primary Examiner—Scott J. Sugarman
Attorney, Agent, or Firm—Christopher E. Blank

[57] ABSTRACT

A method for forming a contact lens comprising subjecting a soft contact lens impregnated with a polymerizable liquid composition which may be polymerized in said lens to render said lens relatively rigid and which may be polymerized upon exposure to radiation with radiation in a selected manner so as to render selected portions of said lens relatively rigid.

5 Claims, 2 Drawing Sheets

METHOD OF MAKING VARIABLE MODULUS LENSES

BACKGROUND OF THE INVENTION

Contact lenses made from at least two materials of different flexibility are known in the art. Typical examples have a relatively rigid center portion surrounded by a relatively soft peripheral portion. Such lens offer the combined advantages of hard and soft contact lens: they offer to some degree the visual acuity afforded by rigid contact lenses and the comfort afforded by soft contact lenses.

The composite lenses have several drawbacks. They are difficult to manufacture, they are not durable due to the fact that a junction between the soft and hard portions of the lenses aren't fully joined, and because of the dissimilarity in polymeric materials, changes in ambient conditions can change the shape of the lens.

U.S. Pat. No. 3,488,111 issued to A. A. Isen teaches a hydrophilic hydrogel contact lens with hard central insert. Isen teaches a special design to hold the relatively rigid central portion in the composite lens.

U.S. Pat. No. 3,489,491 issued to Creighton teaches a composite contact lens with a rigid central body portion and a margin of hydrophilic material on the periphery of said central body portion forming the edge of the lens.

U.S. Pat. No. 3,619,044 issued to Kamath teaches a composite lens with a a central zone made of poly(4-methyl pentene-1) and an outer zone or edge made from a softer polymeric material. The lenses are made by placing a rod of the poly(4-methyl pentene-1) in a cylindrical vessel which was then filled with acrylic acid. The acrylic acid was polymerized to form a rod from which buttons were cut and eventually made into composite contact lenses.

U.S. Pat. No. 3,944,347 issued to Barkdoll, et al. discloses a composite contact lens with a hard center and a soft, tough periphery, both portions being formed from fluoropolymers. This composite design is limited to the use of two specific fluoropolymeric materials. The lenses are formed by inserting a central disk of hard fluoropolymer into a sheet of soft fluoropolymer and subjecting the composite to pressure and heat. Thus a distinct junction exists between the two different polymers.

U.S. Pat. No. 3,973,838 issued to Page discloses a design for a composite contact lens with a hard discrete center and a discrete hydrophilic outer portion. U.S. Pat. No. 4,171,878 issued to Kivnev, et al. discloses a similar contact lens with discrete central and peripheral parts.

U.S. Pat. No. 4,093,361 issued to Erickson, et al. teaches a novel composition useful in forming composite contact lenses comprising a mixture of a hydrophilic polymer and a water soluble solid inert substance which can be removed from the mixture by hydration. This mixture is used to form the peripheral portion of a typical contact lens. The material is relatively rigid until the solid inert substance is removed. Therefore, it can be cast with rigid polymeric materials typically used in rigid contact lenses.

U.S. Pat. No. 4,166,255 issued to Graham teaches composite contact lenses and methods for manufacturing the same. One example of the composite lens involves surrounding a rigid optical element with a soft optical material. A second example involves forming a first layer of a soft polymeric material onto the supporting surface of a female mold member, allowing said layer to partially polymerize, applying monomer which cures to form a rigid polymer so as to allow the rigid polymer to diffuse into the soft polymer, and then curing the whole assembly. This would result in a lens with a relatively rigid central portion and a soft peripheral portion.

U.S. Pat. No. 4,208,362 issued to Deichert, et al. teaches a method for making composite contact lenses by partially polymerizing a first material in a concave mold member, adding a second polymerizable material on top of the partially polymerized first material, and completing the polymerization of both materials. This method produces lenses with three regions: one region comprised of a single type of polymeric material, and an intermediate region comprised of a copolymer of the two materials or an alloy of the two materials.

U.S. Pat. No. 4,666,249 issued to Bauman, et al. teaches a method for producing a contact lens with a relatively rigid central portion and a soft skirt. The lens is made by coating a soft lens with a curable material and then selectively curing the coating in the central portion of the lens to form a rigid coating. Ambient temperature change can distort the shape of the lens produced by such means due to differences in coefficients of expansion between the two materials.

U S Pat. No. 4,701,288 issued to Deichert teaches a method for forming a contact lens from at least two dissimilar polymeric materials by placing a monomeric composition in a mold and subjecting part of the monomer to radiation causing the material to polymerize, and then adding a second monomeric material to the periphery of the first partially polymerized material and then curing said composite lens. This method forms a lens with, potentially, a rigid zone, a flexible zone, and an intermediate zone made of the copolymer or alloy of the two monomeric or polymeric materials.

SUMMARY OF THE INVENTION

Figure 1:
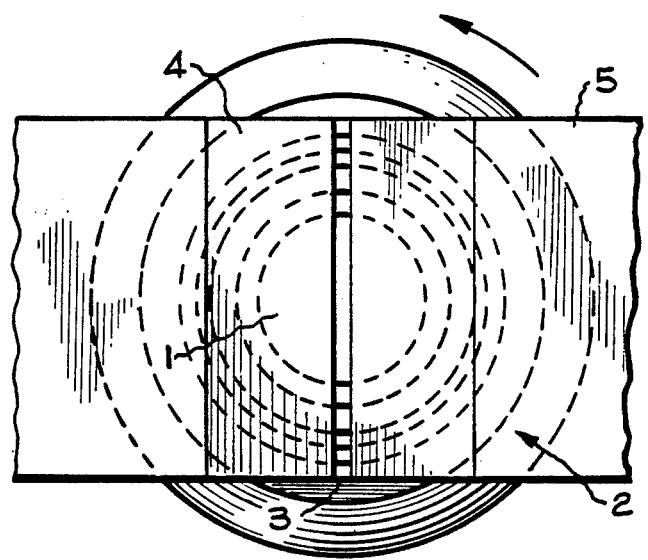
FIG. 1 is a top view schematic representation of one means of providing a radiation intensity gradient to a impregnated contact lens. 1 is the impregnated lens moving relative to the optical mask, 2, which has a clear or transparent slit, 3, and opaque regions, 4 and 5, which define the slit.
Figure 2:
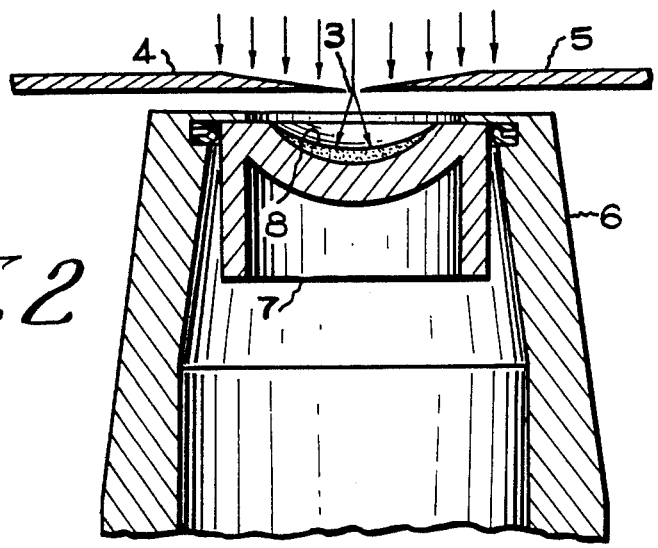
FIG. 2 is a side view of the same means for providing an intensity gradient. 7 is the mold in which the impregnated lens was formed. 6 is the spindle which rotates the lens mold in a spin casting process, 8 is the lens.
Figure 3:
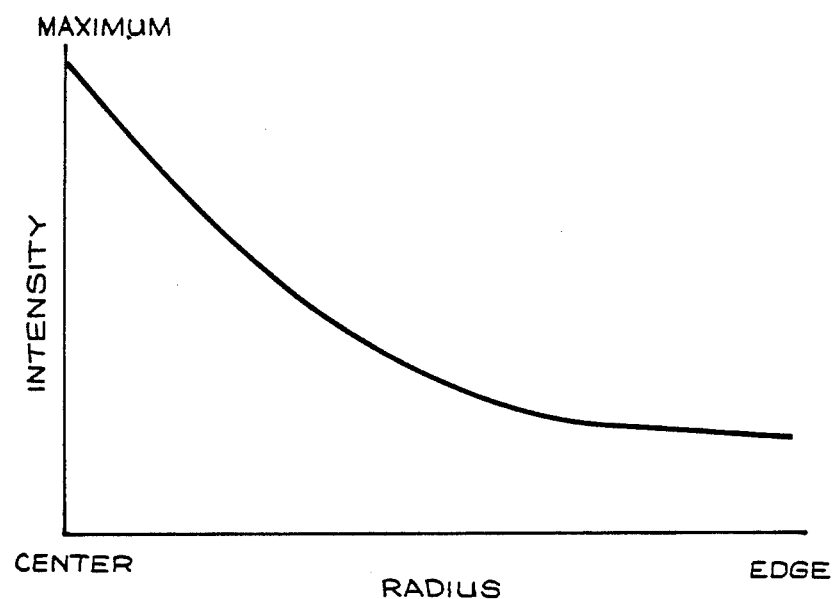
FIG. 3 is the type of intensity gradient achieved by the means of FIGS. 1 and 2.

The present invention relates to a novel method of manufacturing contact lenses which have variable modulus. The method involves impregnating a soft contact lens or a button made from soft contact lens material with a material which can diffuse throughout the lens or button and which can be polymerized to render a polymer alloy or copolymer with the soft contact lens material which is relatively rigid. The impregnating material must also be capable of being polymerized by optical radiation. The impregnated soft contact lens is then irradiated in selected portions of the lens so that these portions are made rigid. The unreacted impregnating material is then removed from the lens.

DETAILED DESCRIPTION OF THE INVENTION

The novel method of the invention comprises the steps: subjecting a soft contact lens impregnated with a polymerizable liquid composition which may be polymerized in said lens to render said lens relatively rigid and which may be polymerized upon exposure to radiation with radiation in a selected manner so as to render selected portions of said lens relatively rigid.

The portions of the impregnated lens which are subjected to radiation is controlled by the use of a mask which has radiation transparent portions and radiation opaque portions. By this means the intensity of radiation supplied to the lens can be controlled. For instance, a mask could be used having a relatively transparent central portion and a relatively opaque annular peripheral portion. When this mask is interposed between the radiation source and the impregnated lens, the central portion of the lens receives relatively high radiation intensity, and the outermost portion of the lens receives little or no radiation. Furthermore, there is no absolute requirement that the optical mask be in discrete transparent and opaque zones. A gradient of optical clarity can be used so that the rigidity of the resultant lens varied across the lens. A lens could be made which was most rigid at its center and which became less rigid as a function of distance form the center of the lens. Alternately, a lens could be made which had its greatest rigidity at the edge of the lens and which became less rigid as a function of distance form the edge towards the center of the lens.

In this manner the present invention provide advantages over state of the art methods for forming composite lenses. First, the addition of the second material, the impregnating material, does not require great precision in its placement on the soft material. A soft lens can be immersed in the lens toughening liquid or a solution thereof until the liquid impregnating material is uniformly dispersed throughout the lens. While the time required for complete impregnation of the lens will vary from impregnant/soft lens combination to combination, one skilled in the art will be able to easily determine the minimum time for impregnation in each case by monitoring the change of weight of the lens, or some other similar factor which is related to the uptake of material by the lens.

Various types of soft lenses can be used in the present invention including poly(hydroxyethylmethacrylate) (PHEMA), polyvinylpyrrolidone (PVP), copolymers of vinylpyrrolidone (VP) and hydroxyethylmethacrylate (HEMA), copolymers of methyl methacrylate (MMA) and VP or HEMA, and silicones and copolymers of silicones and VP or HEMA. The impregnating material will of course depend upon the type of soft contact lens material used. The main requirements for the material are that it be soluble with the soft contact lens material, that it be able to form either a graft copolymer with the soft contact lens material or an alloy which increases the rigidity of the resultant matrix over the soft contact lens material itself, and that it be polymerizable by optical radiation. Specific impregnating materials include ethylene glycol dimethacrylate, neopentylglycol diacrylate, neopentylglycol dimethacrylate, isoborneal methacrylate, allyl methacrylate and isoborneal acrylate. The impregnating materials should also comprise a minor portion of a polymerization initiator. The choice of the initiator will depend on the type of radiation used to irradiate the impregnated lens. For ultraviolet irradiation the initiators include benzoin methyl ether, diethoxy acetophenone, and 2,2-azobis isobutyronitrile. Visible irradiation initiators include excimers such as thioxanthone/dimethyl ethanolamine. Infrared irradiation initiators include t-butylperoctoate and 2,5-dimethyl-2-5-di(2-ethylhexanoylperoxy)hexane.

In order to effectively impregnate the soft contact lens or button, the impregnating material must be of sufficiently low viscosity and must be capable of wetting the surface of the lens. In certain instances the impregnating material may be diluted in a solvent so that it may be diffused into the soft contact lens material.

EXAMPLE

A polymacon lens was saturated with a solution of ethylene glycol dimethacrylate and 0.5 wt.% benzoin methyl ether. The lens was irradiated with an ultraviolet radiation intensity gradient which had its maximum intensity in the lens center and which diminished in intensity so that the lens edge received virtually no radiation. The lens was irradiated for 45 minutes.

Upon completion of the irradiation, the lens was extracted to remove the unreacted ethylene glycol dimethacrylate. Rigidity of the lens was greatest at its center and decreased outwardly. The edge of the lens was substantially of the same flexibility as the originally untreated lens.

What is claimed is:

1. A method for forming a contact lens comprising: subjecting a soft contact lens impregnated with a polymerizable liquid composition which may be polymerized in said lens to render said lens relatively rigid and which may be polymerized upon exposure to radiation with radiation in a selected manner so as to render selected portions of said lens relatively rigid.

2. The method of claim 1 wherein the portion of the unpolymerized polymerizable liquid composition is removed from said lens.

3. The method of claim 1 wherein an optical mask is interposed between the radiation source and said impregnated lens and controls the pattern of radiation intensity on said lens.

4. The method of claim 3 wherein said optical mask is configured so that it imposes a radiation intensity gradient on said impregnated lens having a maximum radiation intensity at the center of said lens and diminishing radiation intensity as a function of the distance from the center of said lens.

5. The method of claim 3 wherein said optical mask is configured so that it imposes a radiation gradient on said lens having a minimum of radiation intensity on the center of said lens and increasing radiation intensity as a function of distance from the center of said lens.

* * * * *